(12) United States Patent
Payton et al.

(10) Patent No.: US 11,575,407 B2
(45) Date of Patent: Feb. 7, 2023

(54) NARROWBAND IQ SIGNAL OBFUSCATION

(71) Applicant: Parsons Corporation, Centreville, VA (US)

(72) Inventors: Joseph Payton, Fredericksburg, VA (US); Nicholas E. Ortyl, III, Bedford, MA (US); Samantha S. Palmer, Henrico, VA (US)

(73) Assignee: PARSONS CORPORATION, Centreville, VA (US)

( * ) Notice: Subject to any disclaimer, the term of this patent is extended or adjusted under 35 U.S.C. 154(b) by 48 days.

(21) Appl. No.: 17/231,361

(22) Filed: Apr. 15, 2021

(65) Prior Publication Data

US 2021/0336651 A1 Oct. 28, 2021

Related U.S. Application Data

(60) Provisional application No. 63/015,796, filed on Apr. 27, 2020.

(51) Int. Cl.
*H04B 1/7156* (2011.01)
*H04W 12/0433* (2021.01)

(52) U.S. Cl.
CPC ...... *H04B 1/7156* (2013.01); *H04W 12/0433* (2021.01); *H04B 2001/71563* (2013.01)

(58) Field of Classification Search
CPC ........ H04B 1/7156; H04B 2001/71563; H04B 1/713; H04W 12/0433
USPC ........................................ 375/130, 134, 137
See application file for complete search history.

(56) References Cited

U.S. PATENT DOCUMENTS

| | | |
|---|---|---|
| 5,365,592 A | 11/1994 | Horner et al. |
| 5,436,847 A | 7/1995 | Schroer et al. |
| 5,867,535 A | 2/1999 | Phillips et al. |
| 6,078,736 A | 6/2000 | Guccione |
| 6,539,438 B1 | 3/2003 | Ledzius et al. |
| 6,874,145 B1 | 3/2005 | Ye |
| 7,210,121 B2 | 4/2007 | Xia et al. |
| 7,317,761 B2 | 1/2008 | Lozhkin |
| 7,320,062 B2 | 1/2008 | Master et al. |
| 7,349,503 B2 | 3/2008 | Husted et al. |
| 7,366,246 B2 | 4/2008 | Walker et al. |
| 7,369,485 B2 | 5/2008 | Halford et al. |

(Continued)

FOREIGN PATENT DOCUMENTS

| | | |
|---|---|---|
| CA | 3097612 A1 | 10/2019 |
| CN | 201476875 | 5/2010 |

(Continued)

OTHER PUBLICATIONS

International Searching Authority, Application No. PCT/US2022/070013, "International Search Report and Written Opinion", Applicant Parsons Corporation, dated Apr. 8, 2022.

(Continued)

*Primary Examiner* — Don N Vo
(74) *Attorney, Agent, or Firm* — Martensen IP; Michael C. Martensen

(57) ABSTRACT

Narrow brand IQ signals are obfuscated by embedding the signal in a buffered portion of wideband IQ frequency data. After the data has been received and buffered, the receiving transceiver, using a wideband IQ frequency data key, of a predetermined and shared format, decodes and reconstitute the narrowband IQ signal.

27 Claims, 7 Drawing Sheets

(56) References Cited

U.S. PATENT DOCUMENTS

| | | | |
|---|---|---|---|
| 7,403,505 B2 | 7/2008 | Yoon et al. | |
| 7,430,257 B1 | 9/2008 | Shattil | |
| RE41,130 E | 2/2010 | Fette et al. | |
| 7,684,467 B2 | 3/2010 | Li et al. | |
| 7,929,937 B2 | 4/2011 | Koivunen et al. | |
| 7,937,601 B2 | 5/2011 | Bakker et al. | |
| 7,987,151 B2 | 7/2011 | Schott et al. | |
| 7,987,432 B1 | 7/2011 | Grechishkin et al. | |
| 8,086,836 B2 | 12/2011 | Chong et al. | |
| 8,364,946 B2 | 1/2013 | Ishebabi | |
| 8,412,111 B2 | 4/2013 | Talwar et al. | |
| 8,615,206 B2 | 12/2013 | Meng | |
| 8,677,378 B2 | 3/2014 | Murotake et al. | |
| 8,763,004 B1 | 6/2014 | Callahan, III | |
| 8,850,411 B2 | 9/2014 | Kelem et al. | |
| 9,663,659 B1 | 5/2017 | Harlow | |
| 2003/0011514 A1 | 1/2003 | Krichofer et al. | |
| 2003/0203717 A1* | 10/2003 | Chuprun | H04B 7/18591 455/12.1 |
| 2004/0023674 A1 | 2/2004 | Miller | |
| 2004/0093595 A1 | 5/2004 | Bilange | |
| 2005/0120346 A1 | 6/2005 | Sprigg | |
| 2005/0125513 A1 | 6/2005 | Sin-Ling Lam et al. | |
| 2006/0195840 A1 | 8/2006 | Sundarrajan et al. | |
| 2006/0218549 A1 | 9/2006 | Hsu et al. | |
| 2006/0248445 A1 | 11/2006 | Rogerson et al. | |
| 2007/0256073 A1 | 11/2007 | Troung et al. | |
| 2008/0040507 A1 | 2/2008 | Hsu et al. | |
| 2008/0134143 A1 | 6/2008 | Hoerentrup et al. | |
| 2008/0147705 A1 | 6/2008 | Bansal et al. | |
| 2008/0198948 A1 | 8/2008 | Tang | |
| 2008/0318544 A1 | 12/2008 | Wang et al. | |
| 2009/0031396 A1 | 1/2009 | Jung et al. | |
| 2009/0119773 A1 | 5/2009 | D'Amore | |
| 2009/0129493 A1 | 5/2009 | Zhang et al. | |
| 2009/0215390 A1 | 8/2009 | Ku et al. | |
| 2009/0279626 A1 | 11/2009 | Wang | |
| 2009/0287894 A1 | 11/2009 | Renno | |
| 2009/0290552 A1 | 11/2009 | Bertorelle | |
| 2009/0307540 A1 | 12/2009 | Razazian et al. | |
| 2009/0313620 A1 | 12/2009 | Sedukhin et al. | |
| 2010/0086074 A1 | 4/2010 | Chen et al. | |
| 2010/0138501 A1 | 6/2010 | Clinton et al. | |
| 2010/0142643 A1 | 6/2010 | Ueda | |
| 2010/0202574 A1 | 8/2010 | Chen et al. | |
| 2010/0205274 A1 | 8/2010 | Gharabally et al. | |
| 2010/0226454 A1 | 9/2010 | Bliss et al. | |
| 2010/0235261 A1 | 9/2010 | Lloyd et al. | |
| 2010/0306773 A1 | 12/2010 | Lee et al. | |
| 2010/0319051 A1 | 12/2010 | Bafna et al. | |
| 2011/0158402 A1* | 6/2011 | Sichitiu | H04L 9/06 380/42 |
| 2011/0296412 A1 | 12/2011 | Banga et al. | |
| 2012/0023194 A1 | 1/2012 | Ruiz-Velasco et al. | |
| 2012/0030672 A1 | 2/2012 | Zygmuntowicz et al. | |
| 2012/0036552 A1 | 2/2012 | Dare et al. | |
| 2012/0054184 A1 | 3/2012 | Masud et al. | |
| 2012/0066679 A1 | 3/2012 | Pappas et al. | |
| 2012/0151479 A1 | 6/2012 | Kothari | |
| 2012/0303695 A1 | 11/2012 | Michel et al. | |
| 2013/0061222 A1 | 3/2013 | Hwang et al. | |
| 2013/0067089 A1 | 3/2013 | Synytskyy et al. | |
| 2013/0102254 A1 | 4/2013 | Cyzs et al. | |
| 2013/0111328 A1 | 5/2013 | Khanna et al. | |
| 2013/0167135 A1 | 6/2013 | Neumann et al. | |
| 2013/0181867 A1 | 7/2013 | Sturdivant et al. | |
| 2013/0191495 A1 | 7/2013 | Almstrand et al. | |
| 2013/0198734 A1 | 8/2013 | Biswas et al. | |
| 2013/0212559 A1 | 8/2013 | Lehtimaki et al. | |
| 2013/0227565 A1 | 8/2013 | Lee et al. | |
| 2013/0283400 A1 | 10/2013 | Schneider et al. | |
| 2013/0308940 A1 | 11/2013 | Kpodzo et al. | |
| 2013/0326499 A1 | 12/2013 | Mowatt et al. | |
| 2013/0332991 A1 | 12/2013 | Rivera | |
| 2013/0346965 A1 | 12/2013 | Conlan et al. | |
| 2014/0007048 A1 | 1/2014 | Qureshi et al. | |
| 2014/0007122 A1 | 1/2014 | Udeshi et al. | |
| 2014/0072947 A1 | 3/2014 | Boguraev | |
| 2014/0079235 A1 | 3/2014 | Lyons | |
| 2014/0219399 A1* | 8/2014 | Nienaber | H04B 1/10 375/340 |
| 2015/0270917 A1 | 9/2015 | Roman et al. | |
| 2015/0356431 A1 | 12/2015 | Saxena | |
| 2017/0011625 A1 | 1/2017 | Stelzig et al. | |
| 2017/0024449 A1 | 1/2017 | Wesley et al. | |
| 2019/0165827 A1* | 5/2019 | Churan | H04L 27/0006 |
| 2020/0162559 A1 | 5/2020 | Sustaeta et al. | |
| 2020/0242516 A1 | 7/2020 | Dhingra et al. | |
| 2021/0377728 A1* | 12/2021 | Min | H04W 12/037 |

FOREIGN PATENT DOCUMENTS

| | | |
|---|---|---|
| CN | 101826889 | 9/2010 |
| CN | 202794534 | 3/2013 |
| CN | 102158242 | 7/2013 |
| DE | 102007034851 | 1/2009 |
| KR | 20020016434 | 3/2002 |
| WO | 2014/118179 A1 | 8/2014 |

OTHER PUBLICATIONS

Anonymous, "Pulse Sequence Pulse Signal Generation Software User Manual", Version 09, Jan. 1, 2018 (Jan. 1, 2018), pp. 125-130. https://scdn.rohde-schwarz.com.

Axell, Erik, et al., "Optimal and Sub-Optimal Spectrum Sensing of OFDM Signals in Known and Unknown Noise Variance." IEEE Journal on Selected Areas in Communications, vol. 29, No. 2, Feb. 2011, pp. 290-304.

Bokharaiee, Simin, "Blind Spectrum Sensing for OFDM-Based Cognitive Radio Systems." IEEE Transactions on Vehicular Technology, vol. 60, No. 3, Mar. 2011, pp. 858-871.

Chen, Hou-Shin, et al., "Spectrum Sensing for OFDM Systems Employing Pilot Tones," IEEE Transactions on Wireless Communications, vol. 8, No. 12, Dec. 2009, pp. 5862-5870.

Rui, Yun, "Frequency Domain Discrete Fourier Transform Spread Generalized Multi-Carrier System and Its Performance Analysis," Computer Communications 32 (2009), pp. 456-464.

Ehringer, "The Dalvik Virtual Machine Architecture", 8 pages, (Mar. 2010).

Li, et al., "XVM: A Bridge Between XML Data and Its Behavior", pp. 155-163, (May 17-22, 2004).

Slade, et al., "Reconfigurable Computing Application Frameworks," Brigham Young University, 10 pages (2003).

Boano, et al., "Controllable Radio Interference for Experimental and Testing Purposes in Wireless Sensor Networks," vww.soda. swedish-ict.se, 8 pages (Apr. 20, 2015).

SPIRENT Communications of Eatontown, L.P., "Spirent Communications TAS 4600A Noise and Interference Emulator Operations Manual," 168 pages (2001).

ITU, "Radio Regulations of the International Telecommunication Union Radiocommunication Sector (ITU-R) (2012 Ed.)", 432 pages (2012).

Al-Khateeb et al. "Recurring and Novel Class Detection Using Class-Based Ensemble for Evolving Data Stream", IEEE Transactions on Knowlede and Data Engineering, IEEE Service Center, Los Alamitos, CA, US, vol. 28, No. 10, Oct. 1, 2016, pp. 2752-2764.

Patent Cooperation Treaty Application No. PCT/US2020/046808, International Search Report and Written Opinion, Applicant Parsons Corporation, dated Nov. 18, 2020.

Patent Cooperation Treaty Application No. PCT/US2020/055369, International Search Report and Written Opinion, Applicant Parsons Corporation, dated Feb. 5, 2021.

Mankun, Xu, et al. "A New Time-Frequency Spectrogram Analysis of FH Signals by Image Enhancement and Mathematical Morphology", Image and Graphics, 2007, ICIG 2007, Fourth International Conference on, IEEE, Piscataway, NJ, USA Aug. 1, 2007, pp. 610-615.

(56) References Cited

OTHER PUBLICATIONS

Simstad, Erik, et al. "Medical Image Segmentation on GPUs—A Comprehensive Review", Medical Image Analysis, vol. 20, No. 1, Feb. 1, 2015, pp. 1-18.

Chu-Carrol, Jennifer, et al. "A Multi-Strategy and Multi-Source Approach to Question Answering", Jan. 1, 2006, URL: https://www.egr.msu.edu/~jchai/QAPapers/IBM.prager.pdf, pp. 1-8.

Abderrazzak, Samadi, et al. "A Syntactic and Semantic Multi-Agent Based Question Answering System for Collaborative E-Learning", 2018 4th International Converence on Optimization and Applications (ICOA), IEEE, Apr. 26, 2018, pp. 1-4.

Patent Cooperation Treaty Application No. PCT/US2020/055370, International Search Report and Written Opinion, Applicant Parsons Corporation, dated Mar. 12, 2021.

Christina Popper et al., "Anti-Jamming Broadcast Communication Using Uncoordinated Spread Spectrum Techniques", IEEE Journal on Selected Areas in Communications, IEEE Service Center, Piscataway, US, vol. 28, No. 5, Jun. 1, 2010 (Jun. 1, 2010), pp. 703-715.

Patent Cooperation Treaty Application No. PCT/US2021/027663, International Search Report and Written Opinion, Applicant Parsons Corporation, dated Aug. 3, 2021.

Patent Cooperation Treaty Application No. PCT/US2021/027682, International Search Report and Written Opinion, Applicant Parsons Corporation, dated Jun. 16, 2021.

\* cited by examiner

NARROWBAND IQ SIGNAL OBFUSCATION

RELATED APPLICATION

The present application relates to and claims the benefit of priority to U.S. Provisional Patent Application No. 63/015, 796 filed 27 Apr. 2020 which is hereby incorporated by reference in its entirety for all purposes as if fully set forth herein. The present application is further related to commonly assigned U.S. patent application Ser. No. 16/996,322.

BACKGROUND OF THE INVENTION

Field of the Invention

Embodiments of the present invention relate, in general, to covert communications and more particularly to obscuring communications with noise manipulation.

Relevant Background

Covert communications or hiding secure communications in plain sight have long been a topic of interest. Most current efforts obscure communications with noise manipulation, or by quickly changing transmit frequencies in order to achieve "low probability of intercept". A need remains to obscure communications by exploiting the computational capability of software-defined radios and their ability to transmit data in a non-time linear function.

Standard communication devices receive a signal through an antenna or the like and thereafter decode data found in the frames or physical layers of the signal. Security rests within a degree of encryption of that data. In traditional frequency agile communications data is transmitted across a plurality of different frequencies over a period of time. The exact pattern is preestablished and known to both the transmitting device and receiver. As a signal arrives in the receiver knows that the next section of data packets will arrive on a prescribed frequency for a set period of time, followed thereafter by another set of packets on a different frequency for a prescribed period of time. Depending on the sophistication of the pattern, interception of such a data stream is low, yet not impossible.

Frequency agile signals are processed as they arrive, that is, in real time. Similarly, they are transmitted in sequential order eliminating, or minimizing a need for a buffer. As long as the transmitter and receiver are using the same sequence and are synchronized a steady stream of data can be achieved. The pairing of a Bluetooth signal for example sets up a transmitter/receiver duo using a known yet unique sequence of frequencies, albeit all within a specific spectral range.

These processes are achievable using a traditional radio. A traditional radio includes an oscillator or signal generator from which it can determine on which frequency to transmit or receive at any point in time. Having multiple oscillators enables two or more simultaneous channels but ultimately the system is limited in its flexibility.

A Software-Defined Radio (SDR), illustrated conceptually in FIG. 1, is a radio communication system where components that have been typically implemented in hardware (e.g., mixers, filters, amplifiers, modulators/demodulators, detectors, etc.) are instead implemented by means of software on a personal computer or embedded system.

While the concept of SDR is not new, the rapidly evolving capabilities of digital electronics render practical many processes which were once only theoretically possible. A basic SDR system may consist of a personal computer 110 equipped with a sound card, channelization and/or sample rate conversion process 120, analog-to-digital converter 130, preceded by some form of RF front end 140. Significant amounts of signal processing are handed over to the general-purpose processor, rather than being done in special-purpose hardware (electronic circuits) as would be done in a traditional radio. Such a design produces a radio which can receive and transmit widely different radio protocols (sometimes referred to as waveforms) based solely on the software used and processing capability.

A SDR receiver uses a variable-frequency oscillator, mixer, and filter to tune the desired signal to a common intermediate frequency or baseband. This signal is then sampled by the analog-to-digital converter. However, in some applications it is not necessary to tune the signal to an intermediate frequency and the radio frequency signal is directly sampled by the analog-to-digital converter (after amplification). In many instances a low-noise amplifier precedes the conversion step coupled with band-pass filters between the antenna and the amplifier, but these added components reduce the radio's flexibility.

Despite the increased use of SDRs the concept of obscure communication remains the same. Frequency agile communication techniques rely on a known, preestablished pattern of hoping which, once synchronized, is transmitted and received (processed) in real time. What is needed is an approach to obscure communications, making it unlikely to be intercepted, that captures the flexibility of an SDR while eliminating the need for receivers and transmitters alike to operate using a known fixed sequence. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Combining Software-Defined Radio technology, storage and computational capability with the ability to transmit data in a non-time linear function enables, according to one embodiment of the present invention, a user to obscure communications using noise manipulation, and/or nonlinear alteration of transmit frequencies, in order to achieve a "low probability of intercept".

According to one embodiment of the present invention, a system for narrowband IQ signal obfuscation, includes a first wideband IQ frequency data transceiver configured to detect wideband IQ frequency data. Coupled to the transceiver is a transitory storage buffer configured to buffer detected wideband IQ data for a predetermined period of time. A wideband IQ frequency data key detector identifies, from the detected and stored wideband IQ frequency data, a wideband IQ frequency data key. Using this key and with access to the buffered wideband IQ frequency data, a wideband IQ frequency data decoder identifies an embedded communication signal.

In another embodiment of the present invention, the first wideband IQ frequency transceiver of the system described above is a software defined transceiver. In addition, the transitory buffer and first wideband IQ frequency signal transceiver can reside within a common housing.

Within the buffered wideband IQ frequency data resides, in one embodiment a wideband IQ frequency data key. This wideband IQ frequency data key when combined with a detector is, in another version of the present invention, a packet detector. The wideband IQ frequency data key can identify a lookback period within the buffered wideband IQ frequency data within which the wideband IQ frequency data decoder identifies a narrowband IQ data sequence constituting a communication signal.

The lookback period described above is based on processing ability of the receiving transceiver to decode a communication signal from the buffered detected wideband IQ data before loss of data. Features of the obfuscated narrowband IQ signal include that the data sequence is uncorrelated, and that the data sequence shuffles data payloads in among other things time, frequency, bandwidth, and/or modulation.

Another feature of the present invention is that the wideband IQ frequency data key is imbedded within the buffered wideband IQ frequency data. This key can also be outside the lookback period.

The system for obfuscating narrowband IQ signals can also include a second wideband IQ frequency data transceiver configured to transmit one or more communication signals receivable by the first wideband IQ frequency data transceiver using the wideband IQ frequency data key. The second wideband IQ frequency transceiver can also be a software defined transceiver.

Portions of the present invention can be embodied as machine executable instructions for narrowband IQ signal obfuscation. These can include a program codes for detecting, by a first wideband IQ frequency data transceiver, wideband IQ frequency data as well as program codes for buffering, on a transitory storage buffer, detected wideband IQ data for a predetermined period of time. The instructions can also include program code for identifying from the detected wideband IQ frequency data a wideband IQ frequency data key and program code for decoding a communication signal from the buffered detected wideband IQ data using the wideband IQ frequency data key.

Additional instructions can be included, according to another embodiment of the present invention, for transmitting by a second wideband IQ frequency data transceiver one or more communication signals receivable by the first wideband IQ frequency data transceiver using the wideband IQ frequency data key. In one version of the present invention the wideband IQ frequency data key is embedded within the buffered detected wideband IQ data. This key identifies, among other things, a lookback period within the buffered detected wideband IQ frequency data. The lookback period is based on processing ability to decode the communication signal from the buffered detected wideband IQ data before loss of data.

Having the key, the present invention includes program code for identifying and decoding a narrowband IQ data sequence constituting a communication signal.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
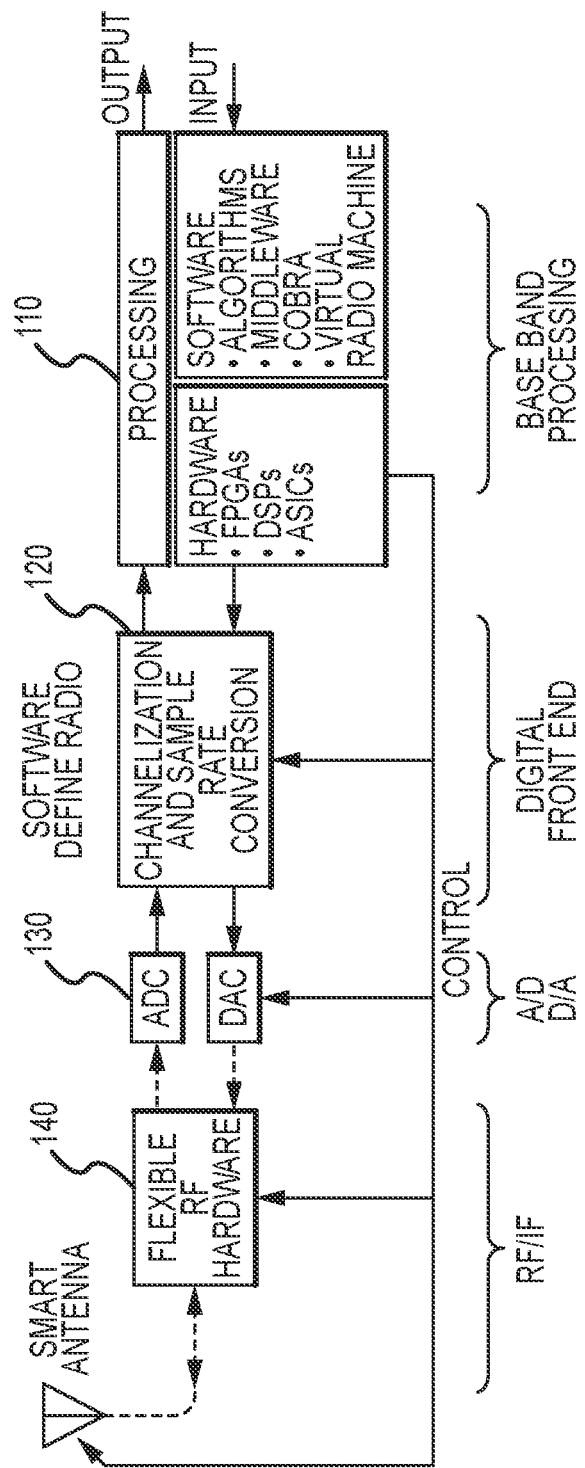
FIG. 1 is a graphical depiction of a software defined radio as would be known to one or reasonable skill in the relevant art.

The Figures depict embodiments of the present invention for purposes of illustration only. Like numbers refer to like elements throughout. In the figures, the sizes of certain lines, layers, components, elements or features may be exaggerated for clarity. One skilled in the art will readily recognize from the following discussion that alternative embodiments of the structures and methods illustrated herein may be employed without departing from the principles of the invention described herein.

DESCRIPTION OF THE INVENTION

The computational capability Software-Defined Radio and the ability to transmit data in a non-time linear function is exploited, according to one embodiment of the present invention, enabling a user to obscure communications using noise manipulation and changing buffered transmit frequencies, so as to achieve a "low probability of intercept".

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The following terms and phrases are, for the purposes of the present invention understood to mean the following.

Data Process or Data processing—Generally, the collection and manipulation of items of data to produce meaningful information. Data processing may include, but is not limited to, validation (ensuring that supplied data is correct and relevant), sorting (arranging items in some sequence and/or in different sets), summarization (reducing detailed data to its main points), aggregation (combining multiple pieces of data), analysis (collection, organization, analysis, interpretation and presentation of data), reporting (list detail or summary data or computed information), visualization (dealing with the graphic representation of data) and classification (separation of data into various categories). Data processes have separate address spaces, whereas threads share their address space. Processes generally interact through system-provided inter-process communication mechanisms Streaming Data—Data that is generated continuously multiple data sources, which typically send in the data records simultaneously, and in small sizes (order of Kilobytes). Streaming data includes a wide variety of data such as log files generated by customers using your mobile or web applications, ecommerce purchases, in-game player activity, information from social networks, financial trading floors, or geospatial services, telemetry from connected devices or instrumentation in data centers and the like. This data needs to be processed sequentially and incrementally on a record-by-record basis or over sliding time windows and used for a wide variety of analytics including correlations, aggregations, filtering, and sampling. Information derived from such analysis gives visibility into many aspects of their business and customer activity such as—service usage (for metering/billing), server activity, website clicks, and geo-location of devices, people, and physical goods—and enables them to respond promptly to emerging situations. For example, businesses can track changes in public sentiment on their brands and products by continuously analyzing social media streams and respond in a timely fashion as the necessity arises. Examples of streaming data include:

Sensors in transportation vehicles, industrial equipment, and farm machinery send data to a streaming application. The application monitors performance detects any potential defects in advance and places a spare part order automatically preventing equipment down time.

A financial institution tracks changes in the stock market in real time, computes value-at-risk, and automatically rebalances portfolios based on stock price movements.

A real-estate website tracks a subset of data from consumers' mobile devices and makes real-time property recommendations of properties to visit based on their geo-location.

A solar power company has to maintain power throughput for its customers or pay penalties. It implemented a streaming data application that monitors of all of panels in the field, and schedules service in real time, thereby minimizing the periods of low throughput from each panel and the associated penalty payouts.

A media publisher streams billions of clickstream records from its online properties, aggregates and enriches the data with demographic information about users, and optimizes content placement on its site, delivering relevancy and better experience to its audience.

An online gaming company collects streaming data about player-game interactions and feeds the data into its gaming platform. It then analyzes the data in real-time, offers incentives and dynamic experiences to engage its players.

Radio Frequency spectrum operations collect and analyze streaming data regarding the spectrum efficiency and communication/data conveyance efficacy.

Transceiver—In radio communication, a transceiver is a device that is able to both transmit and receive information through a transmission medium. It is a combination of a transmitter and a receiver, hence the name transceiver. Transmission is usually accomplished via radio waves, but communications satellites, wired connections, and optical fiber systems can also be used. Radio frequency (RF) transceivers are widely used in wireless devices. For example, cell phones use them to connect to cellular networks. By combining a receiver and transmitter in one consolidated device, a transceiver allows for greater flexibility than what either of these could provide individually.

I/Q Samples/data (In-phase and Quadrature Modulated Samples)—often used in RF applications, form the basis of complex RF signal modulation and demodulation, both in hardware and in software, as well as in complex signal analysis. In electrical engineering, a sinusoid with angle modulation can be decomposed into, or synthesized from, two amplitude-modulated sinusoids that are offset in phase by one-quarter cycle (π/2 radians). All three functions have the same center frequency. These amplitude modulated sinusoids are known as the in-phase and quadrature components. I is the In-Phase signal component while Q is the Quadrature signal component.

Narrowband—Describes a sampled capture or single signal (or aggregate of subchannels) that occupies a relatively small bandwidth. For the purposes of this document, signals that are less than 20 MHz (e.g. a 10 MHz LTE channel or a 200 kHz FM radio broadcast) in bandwidth would be considered Narrowband.

RF—Radio Frequency—Used for wireless communications, and physical sensing, RF Energy is one form of electromagnetic energy which consists of waves of electric and magnetic energy moving together (radiating) through space, oscillating at various rates. The area where these waves are found is called an electromagnetic field.

RF Spectrum (aka Radio Spectrum)—The part of the electromagnetic spectrum with frequencies from 30 hertz to 300 GHz. Electromagnetic waves in this frequency range, called radio waves, are widely used in modern technology, particularly in telecommunications.

Software Defined Radio—(SDR) a radio communication system where components that have been traditionally implemented in hardware are instead implemented by means of software.

Wideband—Describes a sampled capture or single signal (or aggregate of subchannels) that occupies a large bandwidth.

Bandwidth—A range of frequencies within a given band, in particular that used for transmitting a signal.

Key—In cryptography, a key is a piece of information (a parameter) that determines the functional output of a cryptographic algorithm. For encryption algorithms, a key specifies the transformation of plaintext into ciphertext, and vice versa depending on the decryption algorithm. Keys also specify transformations in other cryptographic algorithms, such as digital signature schemes and message authentication codes. For the purposes of the present invention a key provides information on where and how to look for previously transmitted information.

The present invention uses deep buffering alongside of automated awareness of the environment to reduce the probability of signal discovery and intercept even from wideband Radio Frequency (RF) systems. This system of the present invention links the flexibility of a software defined radio with on board computational power in order to send and receive messages securely, while maintaining a small SWAP-C footprint.

The traditional notion of using information from the past/present to determine how to interpret, decode or decrypt transmissions in the present or future (i.e. key exchanges, hop-set exchanges) is flipped by taking advantage of advanced wideband SDR capabilities to store and process a large buffer of data allowing packets in the future to describe (construct) transmissions in the past.

Although many other communications methods involve obscuring communications with noise manipulation, or by quickly changing transmit frequencies in order to achieve "low probability of intercept" none exploit SDRs, computational capability and the ability to transmit data in a non-time linear function.

One embodiment of the present invention utilizes the flexibility of a software defined radio to capture and buffer wideband IQ frequency data. Within the buffered IQ frequency data resides a wideband IQ frequency data key that informs the receiver where and how far back to look within the buffered data to identify an incoming signal. The key not only looks backward in its identification of certain frequencies on which data may reside but also compiles, in one embodiment of the present invention, the signal in a non-linear fashion.

Figure 2:
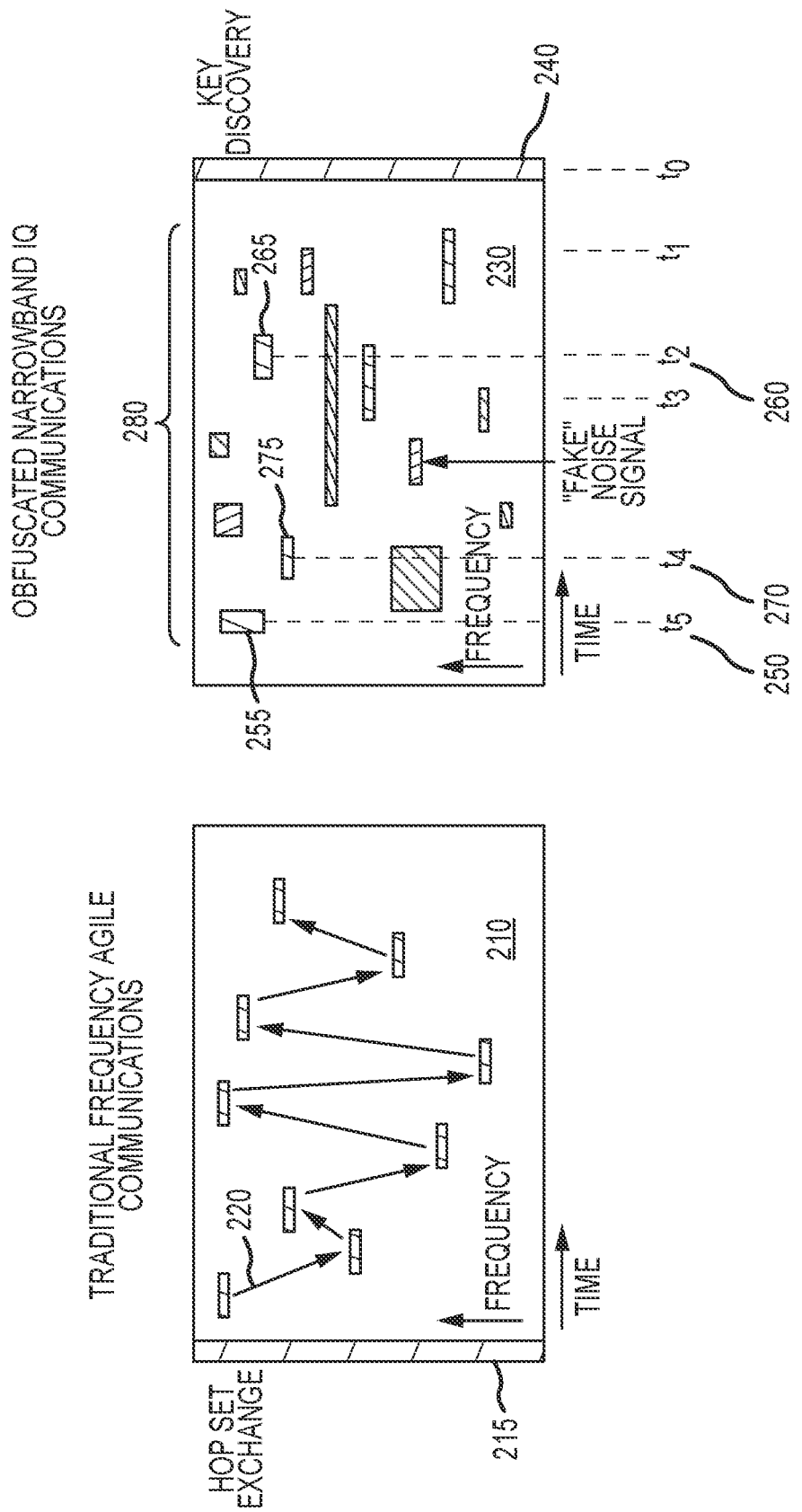
FIG. 2 is a graphical comparison of a traditional frequency agile communication signal to an obfuscated narrowband IQ signal transmitted in accordance with one embodiment of the present invention.

FIG. 2 presents a comparison of a traditional frequency agile communication sequence over time and a backward-looking frequency agile communication example implemented with one embodiment of the present invention. In the traditional approach 210 a hop exchange rate/pattern is preestablished and communicated to the receiving party. The receiver, knowing what the hoping rate and frequency hop pattern key 215, can tune the radio to receive those frequencies, receive data, decode if necessary and formulate the communication signal. The pattern 220 shown in the traditional frequency agile example is a linear pattern, meaning that data is linearly broken into segments and associated with frequencies in the hop pattern. Upon those frequencies being received, the communication signal is linearly recreated. This is a forward-looking system.

The present invention does not provide a conventional preestablished hop pattern and/or rate. In one embodiment of the present invention the receiver is aware that a key 240 is embedded in wideband IQ frequency transmissions. Information with respect to the key, its form, encryption, structure, etc. is possessed by both the transmitting and receiving SDR. The key itself does not contain signal data per se but rather provides details telling the receiver where to look in the past for the signal.

The receiver buffers 230 incoming wideband IQ frequency data. Within the buffered wideband IQ frequency data are several frequency segments of data. The key 240, received at time t0 instructs the receiving SDR by way of key decoder to go backward (for example) to t-5 250 for a first portion of the signal 255, followed by looking at t-2 260 for a second portion 265, and thereafter t-4 270 for a third portion 275, and so on. The key 240 identifies a lookback period 280 in which the signal segments can be found. where to find them, and in what order to retrieve them.

As the buffer is transitory, the oldest portions of data are lost as new data is buffered. The wideband IQ frequency key is dynamic in that as data arrives the lookback period is updated as is the key recognizing that reconstruction of a signal is predicated on using the oldest data in the sequence before data loss. Moreover, since the key is sent after the data has been sent, the transmitting device can adjust the pattern based on the environment and then later, inform the receiving unit of the devised pattern. Unlike traditional frequency agile systems in which the receiver knows the order of frequency segments that form a signal as they arrive, segments of the communication signal are unknown until a time in the future at which point the wideband IQ frequency key tells the receiver to look into past signal data to retrieve one or more portions of data.

Figure 3:
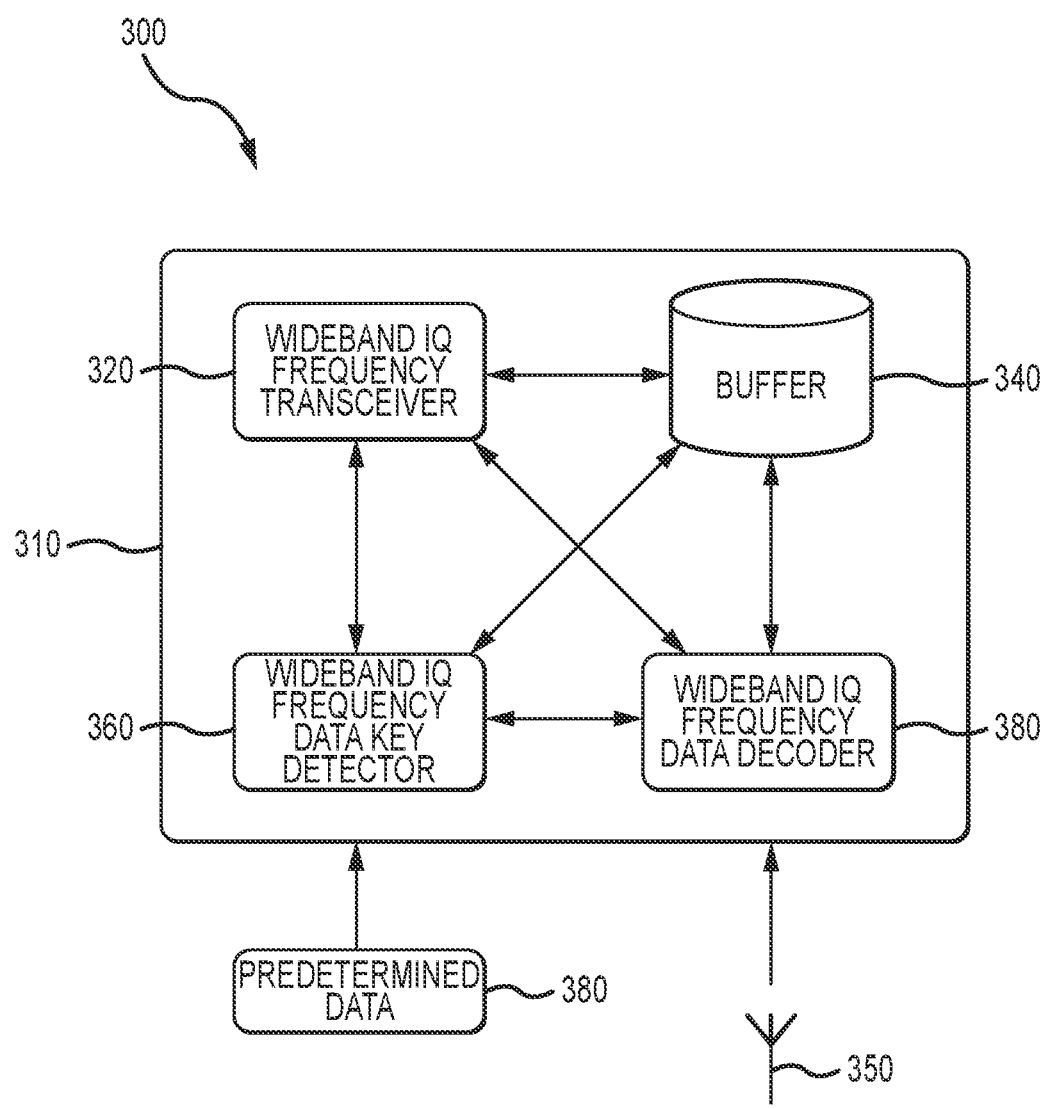
FIG. 3 is a high-level block diagram of a system for narrowband IQ signal obfuscation, according to one embodiment of the present invention.

FIG. 3 is a high-level block diagram of a system 300 for narrowband IQ signal obfuscation, according to one embodiment of the present invention. The system 300 shown in FIG. 3 represents a single transceiver in a transmitter/receiver pair. Each includes a housing 310 or similar structure in which a wideband IQ frequency transceiver 320, which in one embodiment is a wideband SDR, is coupled to a transitory data store 340 operating as a buffer of received IQ frequency data gathered from an antenna 350 or the like. The buffer 340 is communicatively coupled to a wideband IQ frequency data key detector 360 and a wideband IQ frequency data decoder 370. The components residing within the housing are, for the purposes of the present invention, logical depictions. One of reasonable skill in the relevant art will appreciate that the system for narrowband IQ signal obfuscation shown in FIG. 3 includes other necessary components such as a processor, non-transitory storage media and memory for instructions executable by the processor, user interface, network access components, and the like.

Characteristics of the wideband IQ frequency data key is predetermined data 380 that is uploaded and is common among a transmitting/receiving pair of transceivers. The predetermined data is not the key itself but information on how the key will be presented. Each key may provide different information on how to reconstruct a signal from buffered wideband IQ frequency data, but the receiver must possess sufficient information to identify and read the key.

Figure 4:
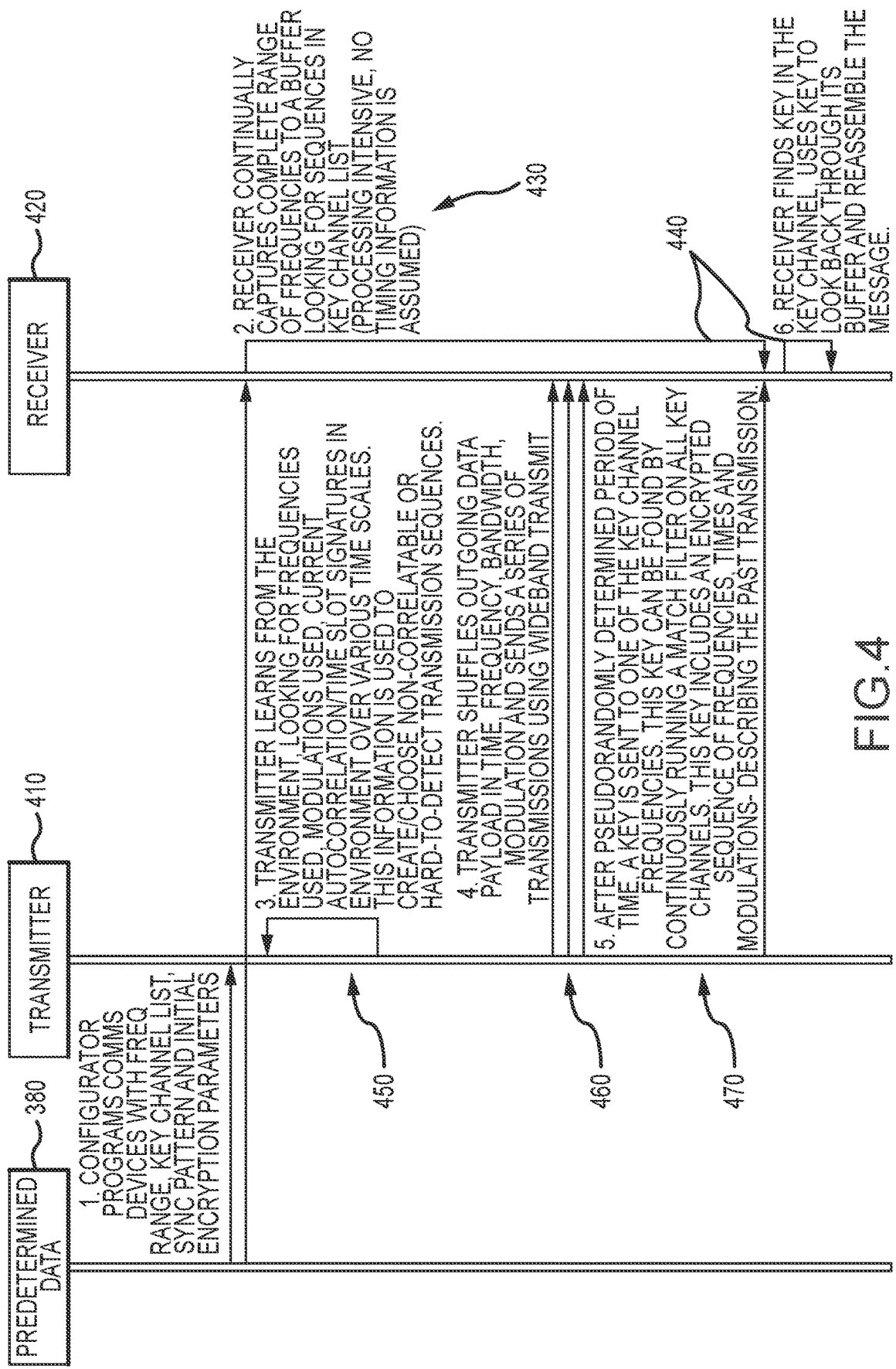
FIG. 4 is a functional data flow diagram according to one embodiment of the present invention, depicting data flow between a transmitter and receiver.

FIG. 4 is a communication flow diagram for narrowband IQ signal obfuscation, according to one embodiment of the present invention. Predetermined data 380 comprising the configuration of the wideband IQ frequency data key is first generated and shared with, in this example, a transmitting 410 and receiving 420 unit. The predetermined data includes, among other things, frequency range information, key channel listings, sync patterns and key encryption parameters.

With predetermined data in hand, the receiver collects and buffers 430 wideband IQ frequency data. As data is collected and buffered the receiver continuously looks 440 for sequences in the key channel list indicative of a wideband IQ frequency data key. The search is processing intensive as no timing information as to when the key will arrive is provided or assumed.

While the receiver is looking 440 for the arrival of a wideband IQ frequency data key, the transmitter is learning 450 from the environment to craft sequences, modulations and the like to obfuscate a narrowband IQ signal within the wideband IQ spectrum. Information such as frequencies being used, modulations present, current autocorrelation schemes, time slot signatures and various time scales are observed in real time and used to craft a pattern/communication transmission scheme that is non-correlated and hard to detect.

With this information in hand the transmitter segments and shuffles 460 outgoing data payloads. The outgoing payload data can be shuffled in time, frequency, bandwidth, modulation and other transmission controllable features as would be known to one skilled in the relevant art. For example (recognizing the values used are for illustrative purposes) assume that the transmitter in the transmitter/receiver pair is knowledgeable that the receiver will buffer 10 seconds of wideband IQ frequency data. Examining the current wideband spectrum, the transmitter determines that a signal lasting 8 seconds can be broken into 6 segments of unequal length, each operating on a frequency which is present in current environment. Within each segment different frequencies and modulations can be used to obfuscate the transmission. The order is also non-linear and includes a discontinuity. For example, using a lookback period of 9 seconds the first segment, segment 1, will be sent at the 6 second point lasting for 0.3 seconds at 150 MHz with segment 2 being sent at the 2 second point lasting 1.2 seconds at 65 MHz, and so forth. The key provides the receiver with information by which to look back in the buffered data to reconstruct the signal before data is lost.

After forming the key, and after already sending the segments of the data according to the key, the transmitter sends 470 to the receiver the wideband IQ frequency data key. The key includes encrypted sequence of frequencies, times, modulations and the like describing wherein in past transmission the signal segments can be found. Upon gaining the key, and using the buffered wideband IQ frequency data, the receiver can decode the wideband data reconstituting the narrowband IQ frequency message.

Figure 5A:
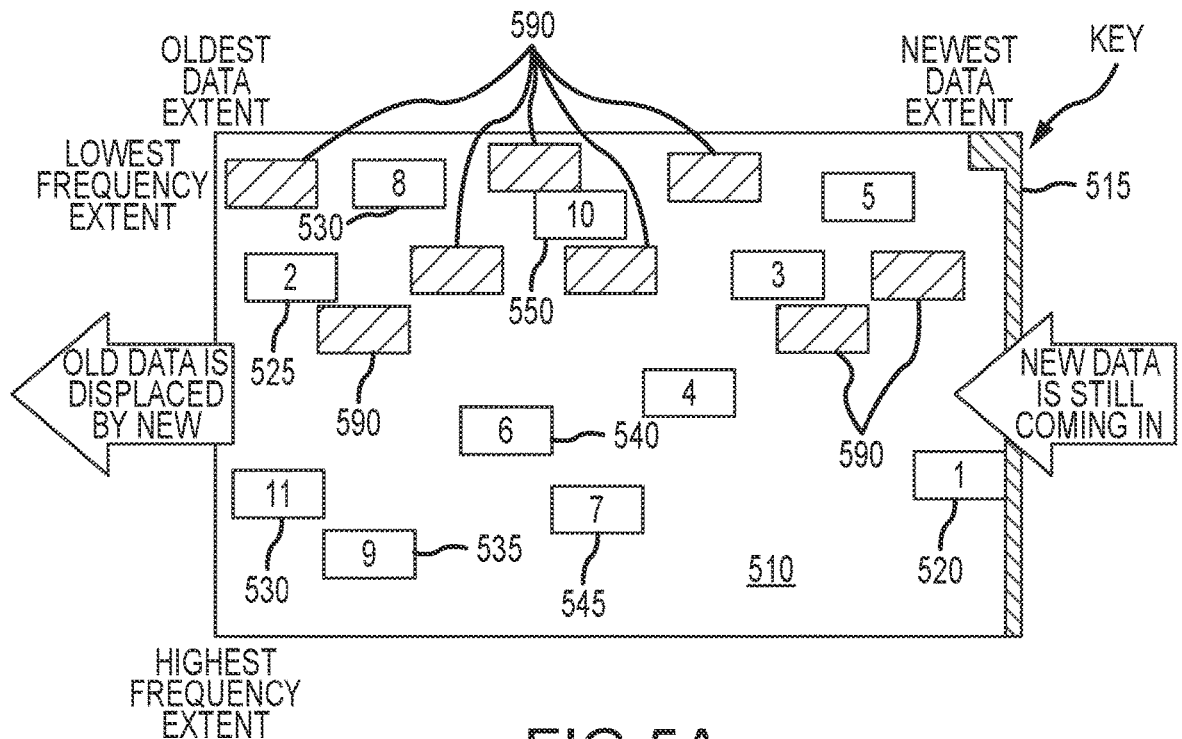
FIGS. 5A and 5B depict buffered wideband IQ frequency data according to one embodiment of the present invention.
Figure 5B:
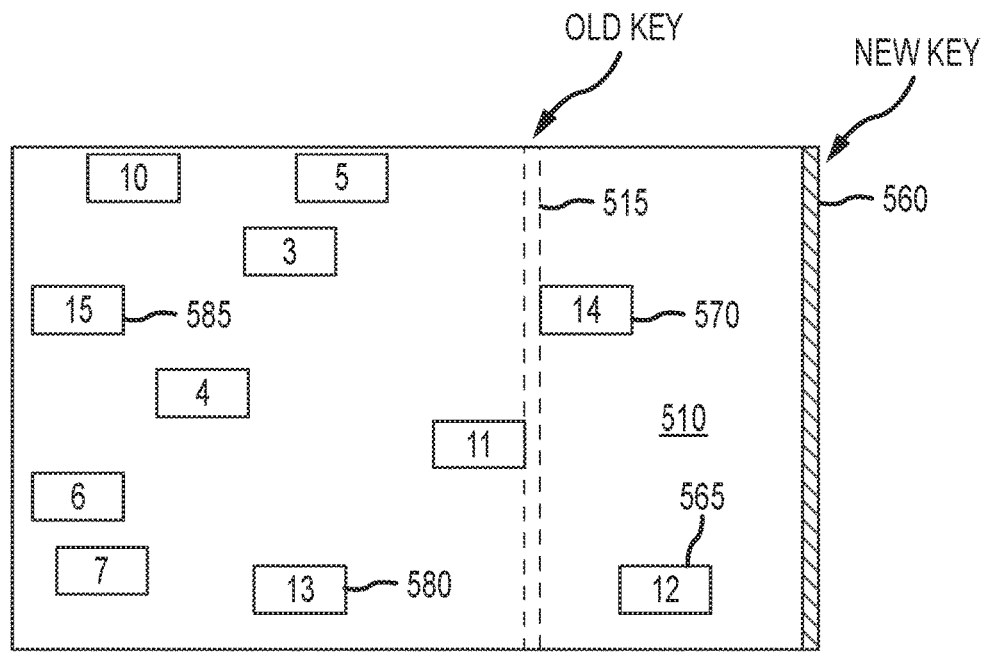

The buffer is a transitory storage of wideband IQ frequency data. As IQ frequency data is collected continuously, the buffer is a sliding window of historical data on which the receiver can look back to retrieve segments of a narrowband communication based on the later received wideband IQ frequency data key. FIGS. 5A and 5B provide and illustration of the data buffer and its relationship to the signal segments of the present invention. The box in FIGS. 5A and 5B represents a buffer of wideband IQ frequency data. While illustrative one of reasonable skill in the relevant art will appreciate that the illustration is not to scale with respect to relationship and scope of data to the size of segments.

Data is continually entering the buffer from the right thereby pushing out older data on the left. Upon receiving a wideband IQ frequency data key, the receiver looks back over a lookback period to identify segments of an incoming signal. The lookback period can correspond to the period over which data is buffered or be a subset of the buffered period. The key can also be outside of the lookback period or within the period in which the signal segments reside.

Turning to FIG. 5A a transitory storage media coupled to a wideband IQ frequency transceiver receives and stores detected wideband IQ frequency data 510. At some point in time a wideband IQ frequency data key 575 is received identifying a signal imbedded in the buffered data 510. In the example shown in FIG. 5A the signal comprises 11 segments. Segment 1 520 was received immediately prior to the key 515. Segment 2 525 was received earlier and will be shortly displaced by new data.

Following instructions provided in the wideband IQ frequency data key 515, which was developed by the transmitter, the receiver reconstructs the signal combining segments 1-11 in sequence. Significantly, segment 11 530 must be retrieved and decoded before it is displaced by newly arriving data. The transmitter, in making the wideband IQ frequency data key must be aware of the processing and buffering capability of the receiver to ensure that in making the key, the receiving unit can both buffer sufficient data and process the same prior to the data being displaced.

It should be noted that segments of the narrowband IQ signal reconstituted by using the wideband IQ frequency data key can overlap. In traditional frequency agile transmissions, segments of a signal are linearly combined. The end of one segment corresponds to the beginning of the next, sequential segment. The present invention is not bound by such a limitation. For example, segments 8 530 and 9 535 overlap as do segments 6 540, 7 545 and 10 550. Moreover, the order of the segments as they are received is not linear. Segment 11 530 of the signal was received before any of the prior segments and the order is, in one embodiment, pseudo randomly generated.

Narrowband IQ signals, as with wideband IQ frequency data, are often continuous and not discrete. Even when the signals are discrete they may extend beyond the buffering capability of a receiver. To accommodate signals of this nature the present invention resends or modifies the wideband IQ frequency data key.

FIG. 5B is a further illustration of the signal and wideband IQ frequency data key first shown in FIG. 5A, albeit at a later point in time. The buffer size 510 remains the same but as more wideband IQ frequency data is received, older data is displaced and lost. As a new wideband IQ frequency data key 560 arrives it can continue the reconstitution of the incoming narrowband IQ signal. For example, the new key 560 informs the receiver that segments of the narrowband IQ signal, segment 12 565 and 14 570, have just been received, while segments 13 580, and 15 585 where already present, yet unrecognized until the new wideband IQ frequency data key was received. By continually updating the wideband IQ frequency data key, a continual narrowband signal can be historically obfuscated.

Narrowband IQ signal obfuscation of the present invention creates a processing and memory barrier resulting in a low probability of interception and/or detection. To identify the narrowband IQ signal residing in the buffered data of the present invention and reconstituted based on the wideband IQ frequency data key, the detector must not only capture and decode the wideband IQ frequency data key but have a sufficient buffer of wideband IQ data to retrieve the segments and processing power to recombine them prior to data loss. Placing the present invention into a small profile, transportable housing further raises the ability of the present invention to obfuscate narrowband IQ signals.

Another feature of the obfuscation of a narrowband IQ signal, according to the present invention, is illustrated in the depiction of the traditional frequency agile signal shown in FIG. 5A. As previously described, traditional frequency agile signals 590 are linear combinations of sequential segments in which each segment is associated with a different frequency. In the example shown in FIG. 5A the traditional signal uses a variety of frequencies in the lower extent of the frequency band. Recognizing this use, the transmitter has placed a significant portion of the segments for the obfuscated narrowband IQ signal in the same portion of the frequency band. The receiver of the traditional signal would see these other segments as portions of a different, yet friendly signal or as noise. In addition, if the traditional receive attempted to interdict the obfuscated narrowband signal of the present invention by overpowering or otherwise denying the lower extent of the frequency band, they would deny their own transmission.

Figure 6:
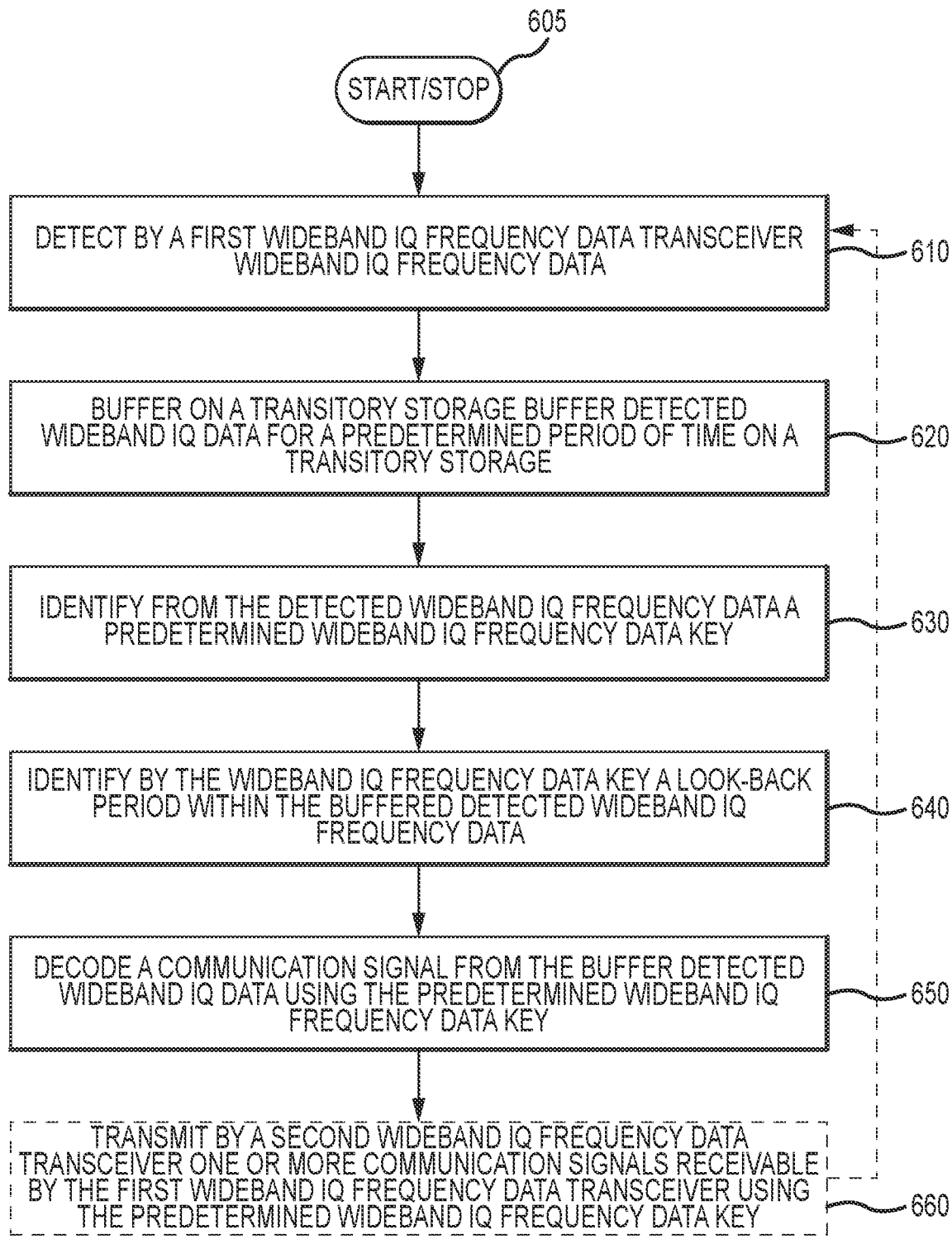
FIG. 6 is one methodology embodiment of a process for obfuscating narrowband IQ signals according to the present invention.

FIG. 6 provides a flowchart depicting an example of a methodology which may be used to obfuscate narrowband IQ signals, according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process begins 605 with the detection 610 and collection, by a first wideband IQ frequency data transceiver, of wideband IQ frequency data. The transceiver buffers 620, and a transitory storage buffer stores, detected wideband IQ data for a predetermined period of time. As the buffer is transitory, the continual source of wideband IQ frequency data displaces older data with new data. Within the buffered data is a narrow band IQ signal. The signal is created by a transmitter knowledgeable of the processing and buffering capability of the receiving transceiver. Having knowledge of the extent by which the receiving transceiver can buffer data and prior to the oldest portion of data being lost, the transmitting transceiver sends a wide band IQ frequency data key to the receiving transceiver. Upon receipt and identification of the wideband IQ frequency data key 630 the receiving transceiver processes the decoding key to identify 640 a lookback period within the buffered data in which the previously sent narrowband IQ signal resides.

Using the wideband IQ data key, the receiving transceiver decodes 650 the narrow band IQ signal. Concurrently with the decoding of the first embedded narrowband IQ signal, the transmitting transceiver, can send 660 a new message with a new wideband IQ frequency data key. As new data it is buffered by the receiving transceiver, the receiving transceiver uses the newly received wideband IQ frequency data key to decode and reconstitute ether additional signal segments or an entirely new signal.

One or more embodiment of the present invention obfuscate narrow brand IQ signals by embedding the signal in a buffered portion of wideband IQ frequency data. After the data has been received, the receiving transceiver, using a wideband IQ frequency data key, of a predetermined and shared format, decodes and reconstitutes the narrowband IQ signal.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

It will also be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, the present invention can be implemented in software. Software programming code which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 7:
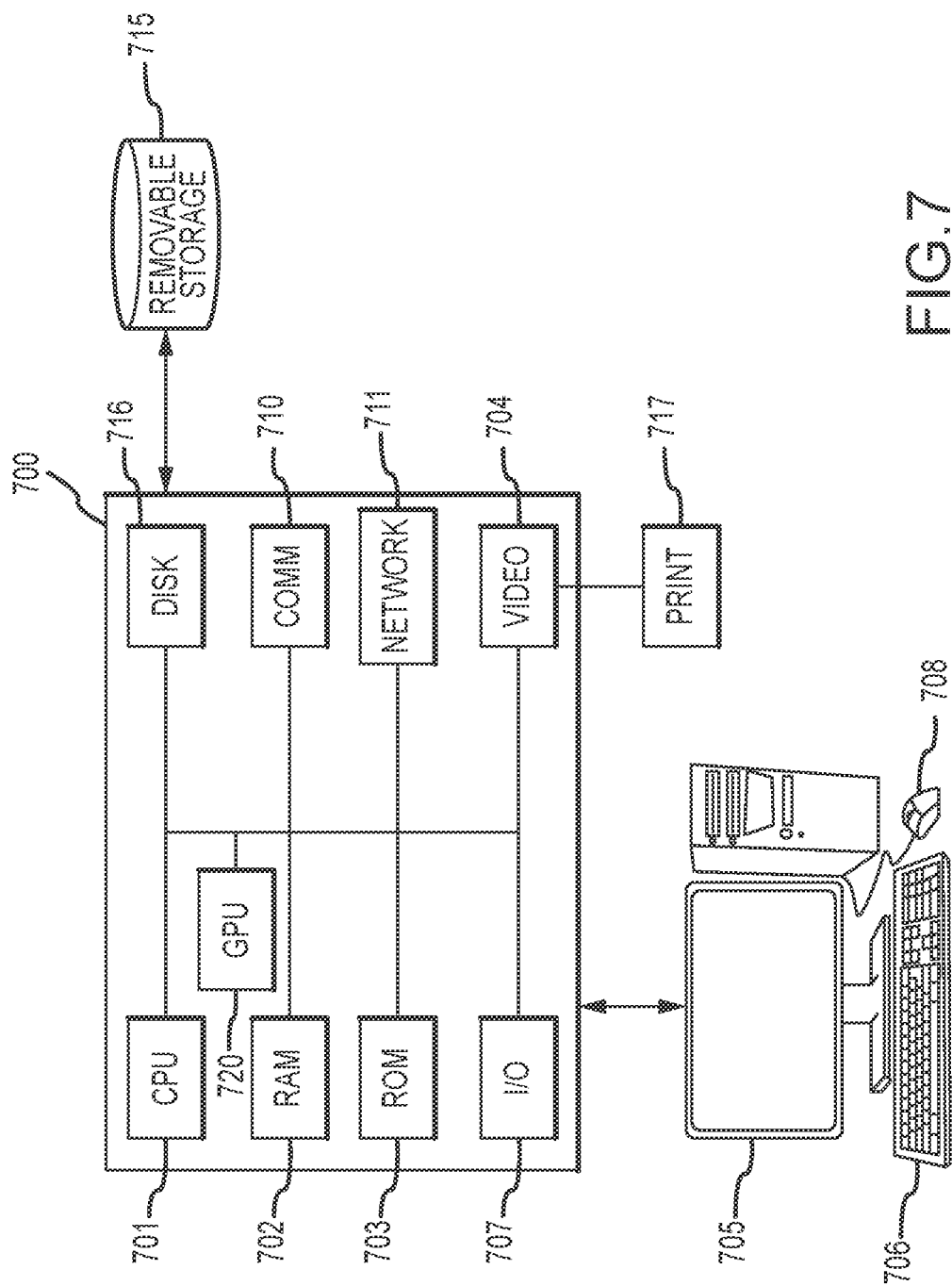
FIG. 7 is a block diagram of a computer system suitable for implementation of one or more embodiments of data stream processing and visualization.

One of reasonable skill will also recognize that portions of the present invention may be implemented on a conventional or general-purpose computing system, such as a personal computer (PC), server, a laptop computer, a notebook computer, a handheld or pocket computer, and/or a server computer. FIG. 7 is a very general block diagram of a computer system in which software-implemented processes of the present invention may be embodied. As shown, system 700 comprises a central processing unit(s) (CPU) or processor(s) 701 coupled to a random-access memory (RAM) 702, a graphics processor unit(s) (GPU) 720, a read-only memory (ROM) 703, a keyboard or user interface 706, a display or video adapter 704 connected to a display device 705, a removable (mass) storage device 715 (e.g., floppy disk, CD-ROM, CD-R, CD-RW, DVD, or the like), a fixed (mass) storage device 716 (e.g., hard disk), a communication (COMM) port(s) or interface(s) 710, and a network interface card (NIC) or controller 711 (e.g., Ethernet). Although not shown separately, a real time system clock is included with the system 700, in a conventional manner.

CPU 701 comprises a suitable processor for implementing the present invention. The CPU 701 communicates with other components of the system via a bi-directional system bus 720 (including any necessary input/output (I/O) controller 707 circuitry and other "glue" logic). The bus, which includes address lines for addressing system memory, provides data transfer between and among the various components. Random-access memory 702 serves as the working memory for the CPU 701. The read-only memory (ROM)

703 contains the basic input/output system code (BIOS)—a set of low-level routines in the ROM that application programs and the operating systems can use to interact with the hardware, including reading characters from the keyboard, outputting characters to printers, and so forth.

Mass storage devices 715, 716 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 7, fixed storage 716 stores a body of program and data for directing operation of the computer system, including an operating system, user application programs, driver and other support files, as well as other data files of all sorts. Typically, the fixed storage 716 serves as the main hard disk for the system.

In basic operation, program logic (including that which implements methodology of the present invention described below) is loaded from the removable storage 715 or fixed storage 716 into the main (RAM) memory 702, for execution by the CPU 701. During operation of the program logic, the system 700 accepts user input from a keyboard and pointing device 706, as well as speech-based input from a voice recognition system (not shown). The user interface 706 permits selection of application programs, entry of keyboard-based input or data, and selection and manipulation of individual data objects displayed on the screen or display device 705. Likewise, the pointing device 708, such as a mouse, track ball, pen device, or the like, permits selection and manipulation of objects on the display device. In this manner, these input devices support manual user input for any process running on the system.

The computer system 700 displays text and/or graphic images and other data on the display device 705. The video adapter 704, which is interposed between the display 705 and the system's bus, drives the display device 705. The video adapter 704, which includes video memory accessible to the CPU 701, provides circuitry that converts pixel data stored in the video memory to a raster signal suitable for use by a cathode ray tube (CRT) raster or liquid crystal display (LCD) monitor. A hard copy of the displayed information, or other information within the system 700, may be obtained from the printer 717, or other output device.

The system itself communicates with other devices (e.g., other computers) via the network interface card (NIC) 711 connected to a network (e.g., Ethernet network, Bluetooth wireless network, or the like). The system 700 may also communicate with local occasionally connected devices (e.g., serial cable-linked devices) via the communication (COMM) interface 710, which may include a RS-232 serial port, a Universal Serial Bus (USB) interface, or the like. Devices that will be commonly connected locally to the interface 710 include laptop computers, handheld organizers, digital cameras, and the like.

While there have been described above the principles of the present invention in conjunction with a system and associated methodology for obfuscation of narrowband IQ signals, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

What is claimed is:

1. A system for narrowband IQ signal obfuscation, comprising
    a first wideband IQ frequency data transceiver configured to detect wideband IQ frequency data;
    a transitory storage buffer coupled to the first wideband IQ frequency data transceiver and configured to buffer the detected wideband IQ data for a predetermined period of time;
    a wideband IQ frequency data key detector configured to identify from the detected wideband IQ frequency data in the transitory storage buffer a wideband IQ frequency data key; and
    a wideband IQ frequency data decoder configured to identify a communication signal within the buffered detected wideband IQ Data using the wideband IQ frequency data key wherein the wideband IQ frequency data key identifies a lookback period within the buffered wideband IQ frequency data within which the wideband IQ frequency data decoder identifies a narrowband IQ data sequence constituting the communication signal.

2. The system for narrowband IQ signal obfuscation according to claim 1, wherein the first wideband IQ frequency transceiver is a software defined transceiver.

3. The system for narrowband IQ signal obfuscation according to claim 1, wherein the transitory buffer and first wideband IQ frequency signal transceiver reside within a common housing.

4. The system for narrowband IQ signal obfuscation according to claim 1, wherein the wideband IQ frequency data key is imbedded within the buffered wideband IQ frequency data.

5. The system for narrowband IQ signal obfuscation according to claim 1, wherein the wideband IQ frequency data key detector is a packet detector.

6. The system for narrowband IQ signal obfuscation according to claim 1, wherein the lookback period is based on processing ability to decode the communication signal from the buffered detected wideband IQ data before loss of data.

7. The system for narrowband IQ signal obfuscation according to claim 6, wherein the narrowband IQ data sequence is uncorrelated.

8. The system for narrowband IQ signal obfuscation according to claim 6, wherein the narrowband IQ data sequence shuffles data payloads in time.

9. The system for narrowband IQ signal obfuscation according to claim 6, wherein the narrowband IQ data sequence shuffles data payloads in frequency.

10. The system for narrowband IQ signal obfuscation according to claim 6, wherein the narrowband IQ data sequence shuffles data payloads in bandwidth.

11. The system for narrowband IQ signal obfuscation according to claim 6, wherein the narrowband IQ data sequence shuffles data payloads in modulation.

12. The system for narrowband IQ signal obfuscation according to claim 6, wherein the wideband IQ frequency data key is imbedded within the buffered wideband IQ frequency data.

13. The system for narrowband IQ signal obfuscation according to claim 6, wherein the wideband IQ frequency data key is outside the lookback period.

14. The system for narrowband IQ signal obfuscation according to claim 1, further comprising a second wideband IQ frequency data transceiver configured to transmit one or more communication signals receivable by the first wideband IQ frequency data transceiver using the wideband IQ frequency data key.

15. The system for narrowband IQ signal obfuscation according to claim 14, wherein the second wideband IQ frequency transceiver is a software defined transceiver.

16. A non-transitory computer-readable storage medium tangibly embodying a program of instructions executable by a machine wherein said program of instruction comprises a plurality of program codes for narrowband IQ signal obfuscation, said program of instruction comprising:
  program code for detecting by a first wideband IQ frequency data transceiver wideband IQ frequency data;
  program code for buffering on a transitory storage buffer detected wideband IQ data for a predetermined period of time on a transitory storage in the transitory storage buffer;
  program code for identifying from the detected wideband IQ frequency data a wideband IQ frequency data key; and
  program code for decoding a communication signal from the buffer detected wideband IQ data using the wideband IQ frequency data key wherein the wideband IQ frequency data key identifies a lookback period within the buffered detected wideband IQ data within which a wideband IQ frequency data decoder identifies a narrowband IQ data sequence constituting the communication signal.

17. The program of instructions for narrowband IQ signal obfuscation embodied on the non-transitory computer-readable storage medium of claim 16, further comprising transmitting by a second wideband IQ frequency data transceiver one or more communication signals receivable by the first wideband IQ frequency data transceiver using the wideband IQ frequency data key.

18. The program of instructions for narrowband IQ signal obfuscation embodied on the non-transitory computer-readable storage medium of claim 17, wherein the first wideband IQ frequency transceiver and the second wideband IQ frequency are each software defined transceivers.

19. The program of instructions for narrowband IQ signal obfuscation embodied on the non-transitory computer-readable storage medium of claim 16, further comprising coupling the first wideband IQ frequency data transceiver to the transitory storage buffer within a common housing.

20. The program of instructions for narrowband IQ signal obfuscation embodied on the non-transitory computer-readable storage medium of claim 16, wherein the wideband IQ frequency data key is embedded within the buffered detected wideband IQ data.

21. The program of instructions for narrowband IQ signal obfuscation embodied on the non-transitory computer-readable storage medium of claim 16, wherein the lookback period is based on processing ability to decode the communication signal from the buffered detected wideband IQ data before loss of data.

22. The program of instructions for narrowband IQ signal obfuscation embodied on the non-transitory computer-readable storage medium of claim 21, wherein decoding includes identifying a narrowband IQ data sequence within the lookback period constituting the communication signal.

23. The program of instructions for narrowband IQ signal obfuscation embodied on the non-transitory computer-readable storage medium of claim 21, wherein the narrowband IQ data sequence is uncorrelated.

24. The program of instructions for narrowband IQ signal obfuscation embodied on the non-transitory computer-readable storage medium of claim 21, wherein the narrowband IQ data sequence shuffles data payloads in time.

25. The program of instructions for narrowband IQ signal obfuscation embodied on the non-transitory computer-readable storage medium of claim 21, wherein the narrowband IQ data sequence shuffles data payloads in frequency.

26. The program of instructions for narrowband IQ signal obfuscation embodied on the non-transitory computer-readable storage medium of claim 21, wherein the narrowband IQ data sequence shuffles data payloads in bandwidth.

27. The program of instructions for narrowband IQ signal obfuscation embodied on the non-transitory computer-readable storage medium of claim 21, wherein the narrowband IQ data sequence shuffles data payloads in modulation.

\* \* \* \* \*